United States Patent
Kurtz et al.

(10) Patent No.: US 9,919,504 B2
(45) Date of Patent: Mar. 20, 2018

(54) DEVICE FOR HIGH-TEMPERATURE WELDING OF A STIFFENER ON A COMPOSITE PANEL HAVING A THERMOPLASTIC MATRIX

(71) Applicant: DAHER AEROSPACE, Saint Julien de Chedon (FR)

(72) Inventors: Didier Kurtz, Pornic (FR); Julie Vaudour, La Chevroliere (FR)

(73) Assignee: DAHER AEROSPACE, Saint Julien de Chedon (FR)

( * ) Notice: Subject to any disclaimer, the term of this patent is extended or adjusted under 35 U.S.C. 154(b) by 471 days.

(21) Appl. No.: 14/381,262

(22) PCT Filed: Feb. 28, 2013

(86) PCT No.: PCT/FR2013/050433
§ 371 (c)(1),
(2) Date: Aug. 27, 2014

(87) PCT Pub. No.: WO2013/128140
PCT Pub. Date: Sep. 6, 2013

(65) Prior Publication Data
US 2015/0114550 A1    Apr. 30, 2015

(30) Foreign Application Priority Data

Feb. 29, 2012    (FR) ..................... 12 51875

(51) Int. Cl.
*B32B 37/10*    (2006.01)
*B29C 65/18*    (2006.01)
(Continued)

(52) U.S. Cl.
CPC .......... *B32B 37/1027* (2013.01); *B29C 65/18* (2013.01); *B29C 66/112* (2013.01);
(Continued)

(58) Field of Classification Search
None
See application file for complete search history.

(56) References Cited

U.S. PATENT DOCUMENTS 7,980,047 B1 *   7/2011   Woody .............. B29C 66/81821
                                                            53/371.8
2010/0124659 A1   5/2010   Nelson et al.

FOREIGN PATENT DOCUMENTS

DE    102010013713 A1   10/2011
EP       0339494 A2    11/1989
(Continued)

OTHER PUBLICATIONS

Machine translation of EP0628399A2. May 6, 1994.*
(Continued)

*Primary Examiner* — Barbara J Musser
(74) *Attorney, Agent, or Firm* — IM IP Law; C. Andrew Im

(57) ABSTRACT

A device for welding the bottom flange of a stiffener on the side of a skin. The stiffener and the skin are made of a composite comprising a thermoplastic polymer matrix. The device comprises a punch, an anvil and a press to make a clamping between the punch and the anvil. The punch comprises a part forming a pressure table with a cross-section width less than or equal to the width of the stiffener bottom flange and a heating element with width less than the width of the pressure table. The anvil comprises a cooling component and has a cross-section width smaller than the width of the skin. A method for implementing the device.

6 Claims, 2 Drawing Sheets

(51) Int. Cl.
    *B29C 65/00*     (2006.01)
    *B29L 31/00*     (2006.01)

(52) U.S. Cl.
CPC .......... *B29C 66/131* (2013.01); *B29C 66/301* (2013.01); *B29C 66/348* (2013.01); *B29C 66/3492* (2013.01); *B29C 66/3494* (2013.01); *B29C 66/474* (2013.01); *B29C 66/5346* (2013.01); *B29C 66/721* (2013.01); *B29C 66/7392* (2013.01); *B29C 66/81811* (2013.01); *B29C 66/81815* (2013.01); *B29C 66/91212* (2013.01); *B29C 66/91231* (2013.01); *B29C 66/91411* (2013.01); *B29C 66/91423* (2013.01); *B29C 66/91445* (2013.01); *B29C 66/91641* (2013.01); *B29C 66/91655* (2013.01); *B29C 66/91931* (2013.01); *B29C 66/91933* (2013.01); *B29C 66/91941* (2013.01); *B29C 66/91945* (2013.01); *B29C 66/71* (2013.01); *B29C 66/7212* (2013.01); *B29C 66/8122* (2013.01); *B29C 66/81261* (2013.01); *B29C 66/81821* (2013.01); *B29C 66/961* (2013.01); *B29L 2031/003* (2013.01); *B32B 2398/20* (2013.01)

(56) References Cited

FOREIGN PATENT DOCUMENTS

| | | | |
|---|---|---|---|
| EP | 0628399 A2 * | 12/1994 | ............. B29C 53/42 |
| EP | 2268471 A1 | 1/2011 | |
| FR | 2691099 A1 | 11/1993 | |
| WO | 2010094808 A2 | 8/2010 | |

OTHER PUBLICATIONS

Weiss, "Nahtloses Fugen von FV-Strukturen", May 2006, Zentrum fur Strukturtechnologien, ETH Zurich, http://e-collection.ethbib.ethz.ch/ecol-pool/dipl/dipl_248.pdf.

Van Dreumel, "Met continue vezels versterkte thermoplasten", Kunststof & Rubber, Feb. 1, 1987, pp. 26-31, vol. 40, No. 2, Rotterdam, The Netherlands.

* cited by examiner

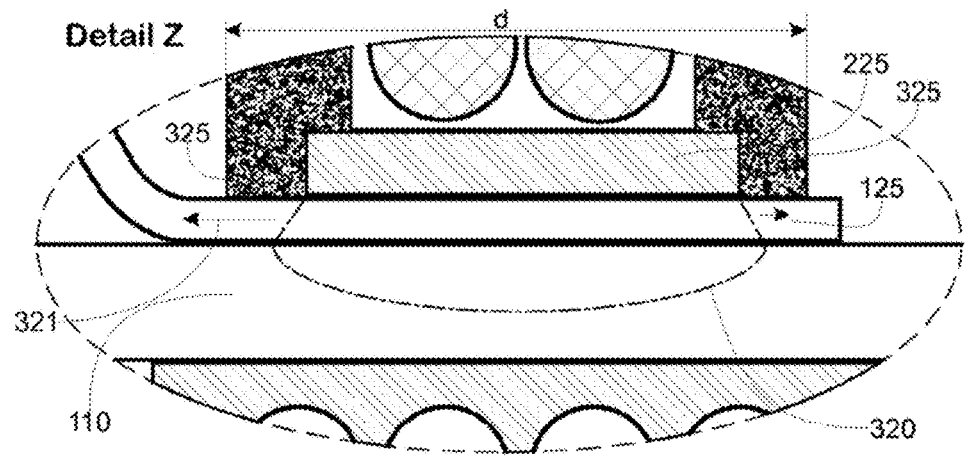
Fig.3
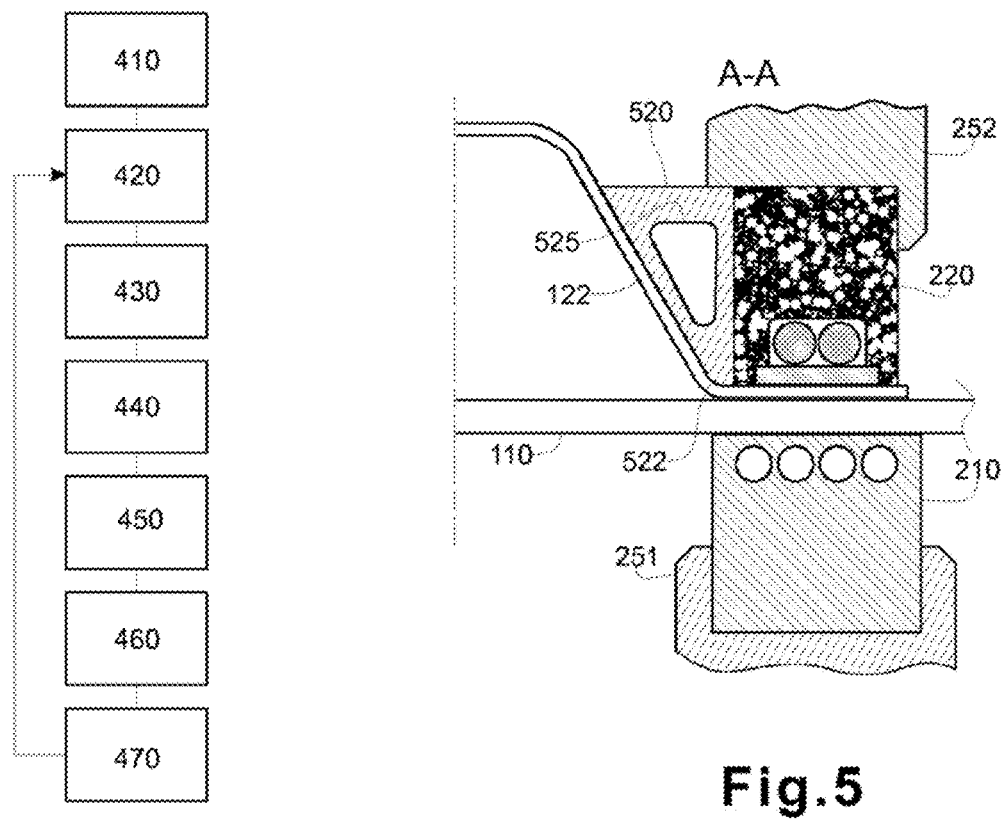
Fig.4
Fig.5

DEVICE FOR HIGH-TEMPERATURE WELDING OF A STIFFENER ON A COMPOSITE PANEL HAVING A THERMOPLASTIC MATRIX

RELATED APPLICATIONS

This application is a § 371 application from PCT/FR2013/050433 filed Feb. 28, 2013, which claims priority from French Patent Application No. 12 51875 filed Feb. 29, 2012, each of which is herein incorporated by reference in its entirety.

TECHNICAL FIELD OF THE INVENTION

The invention relates to a method and device for high-temperature welding of a stiffener on a composite panel having a thermoplastic matrix. The invention is particularly, but not exclusively, intended for making stiffened panels made of composite material with fiber reinforcement, which panels are used as structural elements for aircraft fuselages or wings.

BACKGROUND OF THE INVENTION

The stiffened panels comprise a skin, with thickness about $\frac{1}{1000}^{th}$ of the smallest dimension of the panel, which panel has an area of about a square meter. The skin is stiffened by stringers with a cross section comprising a bottom flange adapted to be supported on a side of the skin and flanges with cross-sections extending along a plane perpendicular to the bottom flange. For example, the cross-section of such a stiffener is shaped in a "T", "I", "L", "Z" or omega (Ω) shape and assembled to the skin by their bottom flange, so that said sections extend along a direction referred to as the longitudinal direction that is substantially parallel to the largest dimension of the skin. In different exemplary embodiments, said skin is alternatively generally flat in shape, shaped in a developable shape or a non-developable shape called a double curvature shape. Longitudinal stiffeners, commonly referred to as 'stringers', extend longitudinally along a direction that is substantially the direction of the lighter curvature of the skin. Finally, the skin may comprise thickness variations that particularly lead to steps on the side of the skin on which the bottom flanges of the stiffeners are supported. While, in the case of a stiffened panel made of metal, the stringers are most often assembled to the skin by riveting, in the case of a panel made of a composite material with fiber reinforcement, the longitudinal stiffeners are preferably assembled to the skin without using mechanical fasteners, particularly by gluing or welding. For example, the document EP-A-2 268 471 describes an assembly method by co-curing a stiffener and a skin to make a stiffened panel, wherein the stiffener and the skin are made of a composite material with fiber reinforcement in a thermosetting matrix. Co-curing of the matrix of the stiffener and the matrix of the skin makes it possible, during the co-curing operation, to make a weld of the stiffener on the skin, where the bond is made by the material making up the thermosetting matrix. This method requires complex tooling, called integral tooling, which can retain the geometric integrity of both the skin and the stiffener during the co-curing operation; the tooling particularly comprises cores placed in the volumes located between the skin and the inside of the flanges of the Omega-shaped stiffener. The tooling, the area of which is at least equal to the area of the panel, is extremely costly to make and is specific to a given panel type; but one aircraft can comprise several hundreds of types of panel.

The document WO 2010/094808 describes a method and device suitable for the localized bonding of a stiffener on a thermosetting composite skin, particularly with a view to repairs. Said device applies pressure on the whole section of the stiffener, so that when said stiffener comprises a hollow section, it must be supported by inserting a core in said section.

Composite materials with a thermoplastic matrix, particularly when the matrix is made of high-performance polymer such as polyetheretherketone or PEEK, have mechanical properties such as impact resistance and fire behavior that make them particularly useful candidates for aeronautics applications, for use as structural materials. However, in order to assemble stiffeners on the skin of such a panel with a thermoplastic matrix, the matrix must be raised to a temperature above its melting temperature. Firstly, that temperature is high, about 400° C. for a PEEK matrix, making the designing of the tool complex, particularly vis-à-vis the control of thermal expansion. Secondly, the need to make the matrix melt and the eventual bulking of the melted polymer make it necessary for the tool to be both sealed and for it to allow the control of volumes, while retaining the placing of reinforcements during the various stages of the assembly operation between the condensed and liquid states of the matrix. These technical problems are obstacles to the use of composite materials with thermoplastic matrices for making large stiffened panels.

OBJECT AND SUMMARY OF THE INVENTION

The invention aims to remedy the drawbacks of the prior art and therefore relates to a device adapted to cooperate with a skin and a stiffener made of a composite comprising a thermoplastic polymer matrix, wherein said stiffener comprises a bottom flange with a width smaller than the width of the skin, for welding said bottom flange on one side of said skin, which device comprises:
  a. a punch comprising a part that forms a pressure table with a cross-section width less than or equal to the width of the stiffener bottom flange and a heating element with width less than or equal to the width of the pressure table;
  b. an anvil with a cross-section width smaller than the width of the skin, which anvil comprises cooling means;
  c. pressure means adapted to make a clamping between the punch and the anvil.

Thus, by combining the localized heating of the bottom flange of the stiffener and the cooling of the anvil, the device according to the invention makes it possible to locally heat the interface between the bottom flange of the stiffener and the skin, and by locally applying clamping pressure, it makes it possible to make the weld and contain the bulking of the polymer making up the matrix during the welding operation, while the parts of the stiffener and the skin that are not subjected to welding remain rigid. The laterally reduced dimensions of the punch and anvil make it possible to significantly reduce the cost of the tooling manufacturing, reduce its overall thermal inertia and thus reduce the cycle time, and also ensure uniform contact pressure in the welding zone. The device according to the invention may also be adapted to several types of part merely by changing the interfaces of contact between the punch and the anvil.

The invention also relates to a method implementing the device according to the invention for welding a stiffener comprising a bottom flange on a skin, wherein the skin and the stiffener are made of a composite comprising a matrix made of thermoplastic polymer, which method comprises the steps of:

i. placing the skin and the bottom flange of the stiffener between the anvil and the punch;
ii. activating the heating element so as to raise the part of the bottom flange exposed to heating to a temperature Tf equal to or greater than the melting temperature of the matrix for a time t;
iii. applying defined clamping between the bottom flange and the skin by means of the punch and anvil;
iv. releasing the pressure between the punch and the anvil when the temperature at the interface between the bottom flange and the skin is less than or equal to the glass transition temperature of the polymer making up the matrix of the composite.

This method makes it possible, by controlling the temperature Tf and the time t, to obtain a trapezoidal heat diffusion profile in the bottom flange of the stiffener and limit the heat affected zone in the skin due to welding so as to maintain, after welding, the nominal compactness of the composite material and particularly avoid squeezing phenomena.

The invention can be implemented advantageously in the embodiments described below, which may be considered individually or in any technically operative combination.

Advantageously, the width of the anvil is substantially equal to the width of the bottom flange of the stiffener. Thus, the anvil is capable of applying a very localized pressure in an area that is precisely the heat affected zone.

Advantageously, the anvil is made of a material with thermal effusivity that is at least 10 times greater than the thermal effusivity of the composite materials making up the skin and stiffener. Thus, in addition to its mechanical function, the anvil acts as a heat sink and prevents the skin from deconsolidating over its entire thickness during welding.

In an advantageous embodiment, the anvil comprises a conduit for the circulation of a fluid. Thus, the anvil can be cooled and its temperature controlled so as to master the transfer of heat through the skin.

In an advantageous embodiment of the device according to the invention, suitable for mass production, the pressure table comprises a part made of ceramic material. This embodiment makes it possible to obtain a pressure interface that is thermally insulating and dimensionally stable, while offering very high resistance to wear and durability.

In another embodiment suitable for making panels in more complex shapes, the pressure table comprises a part made of a material comprising at least 90% mica. This type of composite material has thermal insulation and dilatation characteristics that are comparable to the previous one but is easily machinable and thus adaptable in shape.

Advantageously, the heating element comprises a metal plate in contact with the bottom flange of the stiffener, and the part of the pressure table surrounding said metal plate is made of thermally insulating material. This embodiment simplifies the making of the heating element and makes it possible to effectively and locally transfer heat to the bottom flange of the stiffener.

In one embodiment, more particularly suited to welding a stiffener comprising a joggling on a skin comprising a step, the device according to the invention comprises:

d. an additional effector adapted to apply pressure on a flange of the stiffener.

That additional effector makes it possible to make the bottom flange of the stiffener, softened by the temperature, follow the shape variation of the skin.

Advantageously, the additional effector is made of a material with thermal effusivity that is at least 10 times greater than that of the polymer making up the matrix of the composite. Thus, the additional effector effectively cools the flange on which it acts, so as to keep it in solid state and apply the pressure required for forming the stiffener to the shape of the skin.

Advantageously, the additional effector comprises a conduit for the circulation of a cooling fluid. Thus, additional cooling makes it possible to keep the flange in a solid state and/or reduce the cycle time for making the weld.

In one embodiment of the method according to the invention, the temperature Tf is greater by 5° C. to 10° C. than the melting temperature of the polymer making up the matrix of the composite material. Thus, the moderate heating temperature makes it possible to take advantage of the time for heat propagation in the bottom flange to apply this bottom flange on the skin and make the weld and also limits the bulking of the matrix.

In one advantageous embodiment of the method according to the invention using a device with an anvil comprising conduits for the circulation of fluid, it comprises a step of:

v. circulating a heat-transfer fluid in the conduit of the anvil during the steps ii) to iii).

Thus, the circulation of fluid makes it possible to regulate the temperature of the anvil and thus provide an additional control parameter to adjust the distribution of temperature at the interface between the bottom flange of the stiffener and the skin.

BRIEF DESCRIPTION OF THE DRAWINGS

The invention is described below in its preferred embodiments, which are not limitative in any way, and by reference to FIGS. 1 to 5, wherein:

FIG. 3 is a detailed view of FIG. 2, showing the schematic distribution of temperatures in the thickness of the assembly;

FIG. 4 represents a chart of the steps for implementing the method according to the invention;

FIG. 5 is a partial sectional view along AA of an exemplary embodiment of the device according to the invention in which an additional effector makes it possible to press on a flange of the stiffener.

DETAILED DESCRIPTION OF THE EMBODIMENTS

Figure 1:
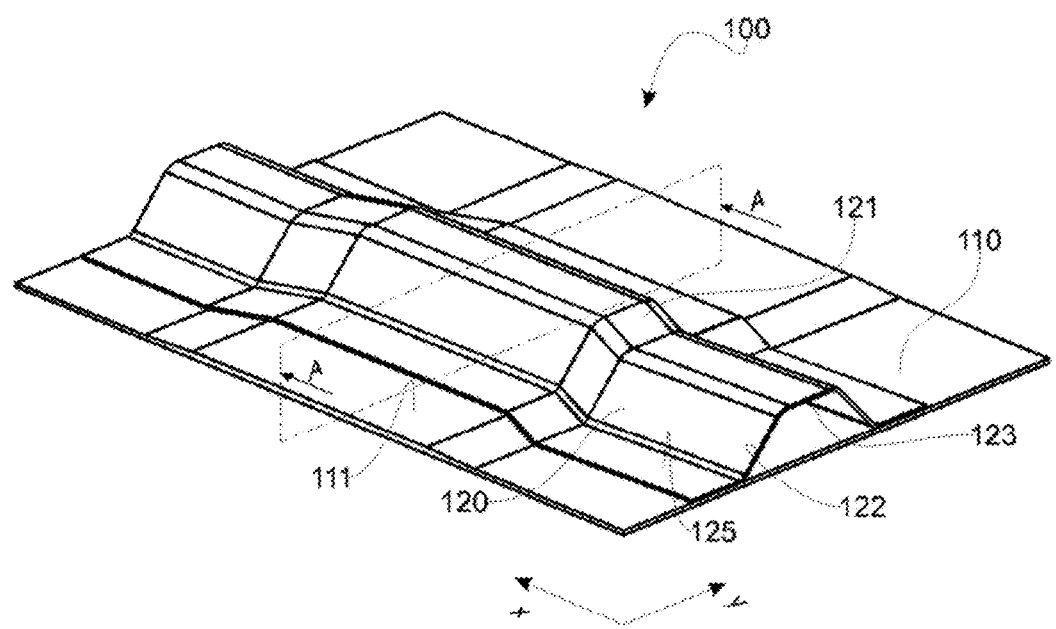
FIG. 1 is a perspective view of a portion of a panel stiffened by an Omega-shaped stiffener.

In FIG. 1 of an exemplary embodiment, a stiffened panel (100) comprises a skin (110) assembled with a stiffener (120), for example an Omega-shaped section (Ω). The panel (100) is represented flat here for graphical simplification reasons; however, the invention may be applied to a panel presenting a curvature along its transverse direction (y) or its longitudinal direction (y). Without it being a limitation, the stiffener (120) is assembled with the skin so that the stiffener extends along the longitudinal direction (x) of the panel, which, for aeronautics applications, generally corresponds to the direction with the lighter curvature. Typically, the minimum curvature radius along the transverse direction is greater than 250 mm and the minimum curvature radius along the longitudinal direction is greater than 1 meter. The thickness of the skin typically ranges between 1 mm and 10 mm but may contain local reinforcement zones (111) that create steps on the surface of the skin, which steps correspond to a joggling (121) on the stiffener (120). The stiffener (120) comprises a bottom flange (125) supported on the skin and flanges (122, 123) extending in a section along a plane perpendicular to the bottom flange (125). In one exemplary embodiment adapted to the method of implementation according to the invention, the skin (110) and the stiffener (120) are made of a composite material with continuous fiber reinforcement in a matrix constituted of thermoplastic polymer. As a non-limitative example, the matrix is made of polyetheretherketone or PEEK reinforced by carbon fiber plies. The skin and stiffener are thus obtained by techniques known in the prior art, consisting in stacking plies of pre-impregnated fibers of PEEK followed by a compacting and consolidation operation and possibly a forming operation.

Figure 2:
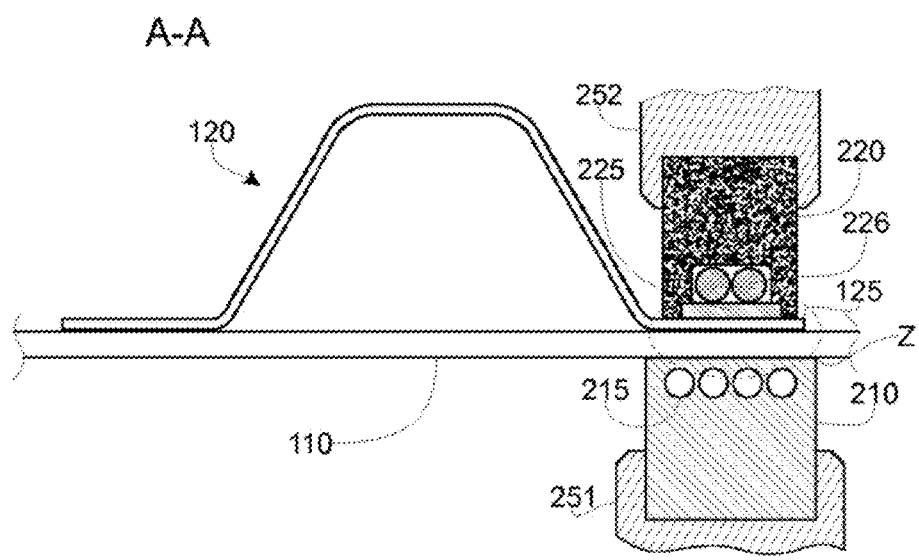
FIG. 2 is a partial view along a section AA defined in FIG. 1, showing an exemplary embodiment of the device according to the invention for assembling the stiffener and the skin of the panel of FIG. 1.

In FIG. 2 of an exemplary embodiment of the device according to the invention, it comprises a punch (220) and an anvil (210) adapted to grip the skin (110) and the stiffener (120) at the height of the bottom flange (125) of said stiffener. To that end, the punch (220) and the anvil (210) are installed on the tables (251, 252) of a press. The punch (220) is made of a material with low thermal conductivity and thermal effusivity of the same magnitude as the thermoplastic matrix of the composite making up the stiffener (120). In one exemplary embodiment, the punch is made of a composite comprising 90% mica and silicone. The anvil (210) is made of a material with high thermal conductivity and high thermal effusivity, between 10 and 100 times higher than the thermal effusivity of the thermoplastic matrix of the composite making up the skin (110). As a non-limitative example, the anvil is made of copper, at least as regards the part in contact with the skin. The thermal effusivity "E" is defined by the relation:

$$E = \sqrt{\lambda \cdot \rho \cdot C}$$

where $\lambda$ is the thermal conductivity coefficient of the material, $\rho$ is its specific gravity and $C$ its specific heat. The thermal effusivity of a material quantifies its capacity to exchange heat with its environment. Thus, the thermal effusivity of PEEK is about 330 $J \cdot K^{-1} \cdot m^{-2} \cdot s^{-1/2}$, the thermal effusivity of copper is about 36,000 $J \cdot K^{-1} \cdot m^{-2} \cdot s^{-1/2}$, that of steel is about 14,000 $J \cdot K^{-1} \cdot m^{-2} \cdot s^{-1/2}$. When a first material with thermal effusivity $E_1$ is raised to the temperature $T_1$ and is put in contact with a second material with thermal effusivity $E_2$ at the temperature $T_2$, the immediate temperature T (leaving aside the contact resistance) at the interface of two materials is given by the relation:

$$T = \frac{E_1 T_1 + E_2 T_2}{E_1 + E_2}$$

Thus, the anvil produces effective cooling of the side of the skin with which it is in contact.

In the exemplary embodiment represented in FIG. 2, the punch (220) comprises heating means comprising a metal plate (225) clasped in the insulating part and electrical resistors (226) adapted to heat said metal plate. These electrical resistors are advantageously of the self-regulating type when the welding temperature is compatible with that technology. The anvil (210) is drilled with conduits (215) in which a heat-transfer fluid circulates in the gaseous or liquid form. Thus, the temperature of the anvil is regulated, as is the temperature and heating time at the punch, so as to obtain the spatial temperature gradient according to the thickness of the assembly and the width of the bottom flange (125).

In FIG. 3, the thermally insulating part (325) of the punch and the metal heating plate (225) form, upon contact with the bottom flange (125) of the stiffener, a pressure table of substantially the same width (d) as the width of the bottom flange (125). The combination of localized heating over the width of the heating plate (225) and the effect of cooling the anvil (210) produces in the thickness of the bottom flange a temperature distribution profile (320) that is substantially trapezoidal; the melting front further extends laterally (321) in the bottom flange. Thus, the matrix volume melted during heating corresponds to that profile (320) in its section. In the skin (110), that melted volume is contained by the part of the matrix remaining solid, as the melting only affects one or two plies in thickness and a width less than or equal to the width of the bottom flange (125) of the stiffener.

In a preferred exemplary embodiment, the heating plate (225) of the punch is raised to a temperature Tf that is very slightly greater, by between 5° C. and 10° C., than the melting temperature of the polymer making up the matrix of the composite making up the stiffener, so that the bottom flange (125) is in a pasty state in the melted part. The thermally insulating parts (325) of the punch press down on the initially solid parts of the matrix, allowing the application of clamping between the bottom flange (125) and the skin (110); these bottom flange parts that are initially solid are then melted, also into a pasty state, by the propagation (321) of the melting front. The distance between the tables (251, 252) of the press is maintained during the full melting of the bottom flange, making it possible to retain the volume and avoid squeezing or the displacement of plies. That positioning of the tables (251, 252) is retained till the melted zone is cooled and it reaches a suitable condensation state, generally, till the temperature of the heat affected zone is equal to or less than the glass transition temperature of the polymer. The temperature Tf of heating that is relatively low makes it necessary, to carry out the weld, to apply sufficient pressure at the interface to diffuse segments of molecular chains through the interface. Because of the small width of the punch (220) and the anvil (210), the method according to the invention makes it possible to apply the pressure effectively and locally.

The shape (320) of the melted zone and its change over time are determined by the heating temperature Tf and the heating time t applied, and the temperature of the anvil (110). These conditions of implementation are, for instance, determined by thermal simulations or tests depending on the materials assembled and their dimensional characteristics. The heating temperature Tf is at least equal to the melting temperature of the polymer making up the matrix of the composite material and advantageously slightly greater than it. Thus, the zone (320) that has been affected thermally by melting is reduced, and even if the melting temperature of the polymer making up the matrix is very high, as in the case of PEEK, the welding cycle time is short, generally below 10 seconds, particularly due to the low thermal inertia of the punch (220) and the anvil (210) by comparison with the integral tools of the prior art.

Returning to FIG. 2, the punch (220) and the anvil (210) are fitted on the press tables (251, 252) so as to be removable, so that they can be changed to adapt to the shape of the skin and stiffener, depending on the width of the bottom flange (125) and also the curvature of the panels. More particularly, the punch (220) or even the anvil (210) may be machined to follow the steps in the skin and the plunging of the stiffeners. Thus, the insulating part of the punch is advantageously made of mica or a mica composite, which is easily machinable and precisely adaptable, while offering high thermal insulation qualities. Alternatively, the insulating part of the punch may be made of ceramic material such as alumina or zirconia for better wear resistance.

In FIG. 4, according to an exemplary embodiment, the method according to the invention comprises a first placing step (410) consisting in installing the stiffeners on the skin. These can be maintained locally on a temporary basis, for example with the help of adhesives. During a positioning step (420), the bottom flange of a first stiffener and the skin are placed between the punch and the anvil. During the next step (430), the circulation of the heat-transfer fluid is triggered in the anvil. During a heating step (440), the resistors are supplied with electrical current so as to raise the temperature of the heating plate to at least the melting temperature of the matrix during a time t. After a time $t_1$ less than t, the bottom flange of the stiffener is applied against the skin during a pressing step (450), contact is maintained between the bottom flange and the skin, while retaining the distance between the press tables up to the end of time t. During a cooling step (460), heating is stopped, the circulation of the heat-transfer fluid is retained, as is clamping, till the temperature of the heat affected zone reaches the glass transition temperature of the matrix. That cooling time may be determined by tests or simulations, or, the temperature may be controlled by a thermocouple placed on the heating plate. During a displacement step (470), the press tables are opened and the panel is moved to make the next assembly.

In FIG. 5, according to an exemplary embodiment, the device according to the invention comprises an additional effector (520). That effector makes it possible to apply clamping pressure on the stiffener by acting on a flange (122) of the stiffener, particularly a flange (122) that is adjacent to the bottom flange of said stiffener, or on the connection (522) between that flange (122) and the bottom flange (125) of the stiffener. This embodiment is particularly suited to the forming of the bottom flange of the stiffener according to the shape of the skin. Thus, this embodiment of the device according to the invention makes it possible to correct the slight mismatches of shape between the stiffener and the skin when they are curved or between the joggling of a stiffener and a step on the skin. Said additional effector (520) makes it possible to apply forming pressure on the stiffener while the bottom flange is in a pasty state. To that end, the additional effector is partly made of metallic material with high thermal effusivity, and in an advantageous embodiment, comprises a cooling conduit (525) for the circulation of heat-transfer fluid, which may be a liquid or a gas.

The description above and the exemplary embodiments show that the invention achieves the objectives sought; in particular, it makes it possible to assemble, with high-temperature welding, a stiffener and a skin made of a composite having a thermoplastic matrix by means of simplified tooling, with low thermal inertia, while retaining the geometric integrity of the elements present, without deconsolidating the assembled parts, by controlling the shape and the propagation of the melting front in the bottom flange of the stiffener and the skin.

The invention claimed is:

1. A device configured to cooperate with a skin and a stiffener made of a composite comprising a thermoplastic polymer matrix having a thermal effusivity, wherein the stiffener comprises a bottom flange with a width smaller than a width of the skin, for welding the bottom flange on one side of the skin, the device comprising:
    a punch comprising a part forming a pressure table with a cross-section width less than or equal to the width of the stiffener bottom flange and a heating element with a width less than the width of the pressure table, the heating element comprising a metal plate in contact with the bottom flange of the stiffener, and wherein the part of the pressure table, surrounding the metal plate, is made of a thermally insulating material;
    an anvil with a cross-section width smaller than the width of the skin, and comprising a cooling element;
    an additional effector configured to apply pressure on a flange of the stiffener, the additional effector being made of a material with a thermal effusivity that is at least 10 times greater than the thermal effusivity of a polymer making up the thermoplastic polymer matrix of the composite, and the additional effector comprises a conduit for circulating a cooling fluid; and
    a press configured to make a clamping between the punch and the anvil.

2. The device according to claim 1, wherein a width of the anvil is substantially equal to the width of the bottom flange of the stiffener.

3. The device according to claim 1, wherein the anvil is made of a material with a thermal effusivity that is at least 10 times greater than the thermal effusivity of a polymer making up the thermoplastic polymer matrix of the composite.

4. The device according to claim 1, wherein the anvil comprises a conduit for circulating the cooling fluid.

5. The device according to claim 1, wherein the part of the pressure table is made of ceramic material.

6. The device according to claim 1, wherein the part of the pressure table is made of a material comprising at least 90% mica.

* * * * *